United States Patent
Muehlenstaedt et al.

(10) Patent No.: US 12,430,236 B2
(45) Date of Patent: Sep. 30, 2025

(54) SYSTEMS AND METHODS FOR MONITORING PROGRESSION OF SOFTWARE VERSIONS AND DETECTION OF ANOMALIES

(71) Applicant: Volkswagen Group of America Investments, LLC, Reston, VA (US)

(72) Inventors: Thomas Muehlenstaedt, Bavaria (DE); Roman Nagy, Unterhaching (DE); Yunxin Gu, Pittsburgh, PA (US)

(73) Assignee: Volkswagen Group of America Investments, LLC, Reston, VA (US)

( * ) Notice: Subject to any disclaimer, the term of this patent is extended or adjusted under 35 U.S.C. 154(b) by 203 days.

(21) Appl. No.: 18/321,935

(22) Filed: May 23, 2023

(65) Prior Publication Data
US 2024/0045794 A1 Feb. 8, 2024

Related U.S. Application Data (60) Provisional application No. 63/393,423, filed on Jul. 29, 2022.

(51) Int. Cl.
*G06F 11/3668* (2025.01)
*G06F 11/32* (2006.01)
(Continued)

(52) U.S. Cl.
CPC ........ *G06F 11/3692* (2013.01); *G06F 11/368* (2013.01); *G06F 11/3688* (2013.01);
(Continued)

(58) Field of Classification Search
CPC ............... G06F 11/3692; G06F 11/368; G06F 11/3688; G06F 11/2263; G06F 11/263;
(Continued)

(56) References Cited

U.S. PATENT DOCUMENTS

| | | |
|---|---|---|
| 11,030,364 B2 | 6/2021 | Sholingar et al. |
| 11,086,318 B1 | 8/2021 | Davis et al. |

(Continued)

FOREIGN PATENT DOCUMENTS

| | | |
|---|---|---|
| CN | 107122298 A | 9/2017 |
| CN | 107992410 A | 5/2018 |

(Continued)

OTHER PUBLICATIONS

International Search Report for PCT/US2023/023684 dated Sep. 19, 2023, 3 pages.

(Continued)

*Primary Examiner* — Anibal Rivera
(74) *Attorney, Agent, or Firm* — Fox Rothschild LLP (57) ABSTRACT

Disclosed herein are system, method, and computer program product embodiments for detecting anomalies during software testing. The methods include generating a plurality of test reports for the software program by executing one or more test cases on a plurality of versions of the software program, generating a control chart based on the plurality of test reports, generating an alert when at least one testing characteristic includes an anomaly over the plurality of versions of the software program as determined based on the control chart. The control chart includes a plot associated with at least one testing characteristic of the software program, and a historical context associated with execution of the one or more test cases on the plurality of versions of the software program.

18 Claims, 7 Drawing Sheets

(51) Int. Cl.
  *G06F 11/36* (2025.01)
  *G06F 11/3698* (2025.01)
  *G06F 8/71* (2018.01)
  *G06F 8/77* (2018.01)
  *G06F 9/445* (2018.01)
  *G06F 9/455* (2018.01)
  *G06F 11/22* (2006.01)
  *G06F 11/263* (2006.01)
  *G06F 11/3604* (2025.01)
  *G06F 11/362* (2025.01)
  *G06F 16/23* (2019.01)
  *G06F 16/25* (2019.01)

(52) U.S. Cl.
  CPC .......... *G06F 8/71* (2013.01); *G06F 8/77* (2013.01); *G06F 9/445* (2013.01); *G06F 9/45508* (2013.01); *G06F 11/2263* (2013.01); *G06F 11/263* (2013.01); *G06F 11/323* (2013.01); *G06F 11/3608* (2013.01); *G06F 11/3636* (2013.01); *G06F 11/3696* (2013.01); *G06F 16/2379* (2019.01); *G06F 16/254* (2019.01)

(58) Field of Classification Search
  CPC . G06F 8/71; G06F 8/77; G06F 16/254; G06F 11/3696; G06F 11/3698; G06F 11/323; G06F 11/3636; G06F 11/3608; G06F 11/3664; G06F 9/45508; G06F 9/445; G06F 16/2379
  See application file for complete search history.

(56) References Cited

U.S. PATENT DOCUMENTS

| | | | |
|---|---|---|---|
| 11,150,660 | B1 | 10/2021 | Kabirzadeh et al. |
| 11,364,927 | B2 | 6/2022 | Wolff |
| 11,734,157 | B2 | 8/2023 | Sahu et al. |
| 11,891,088 | B1* | 2/2024 | Kobilarov ............ G07C 5/0808 |
| 12,060,060 | B1 | 8/2024 | Costantino et al. |
| 2004/0006447 | A1* | 1/2004 | Gorin ............... G01R 31/31707 702/181 |
| 2006/0123389 | A1 | 6/2006 | Kolawa et al. |
| 2007/0136024 | A1* | 6/2007 | Moser ................. G06F 11/3688 702/186 |
| 2008/0065328 | A1 | 3/2008 | Eidehall et al. |
| 2011/0178967 | A1* | 7/2011 | Delp ...................... G06N 3/088 706/20 |
| 2012/0331439 | A1 | 12/2012 | Zimmermann et al. |
| 2014/0035775 | A1 | 2/2014 | Zeng et al. |
| 2016/0026915 | A1* | 1/2016 | Delp ..................... G06F 11/263 706/20 |
| 2016/0059855 | A1 | 3/2016 | Rebhan et al. |
| 2016/0101779 | A1 | 4/2016 | Katoh |
| 2016/0257216 | A1* | 9/2016 | Al-Awami ............ B60L 58/13 |
| 2017/0206095 | A1 | 7/2017 | Gibbs et al. |
| 2017/0329332 | A1 | 11/2017 | Pilarski et al. |
| 2018/0046931 | A1 | 2/2018 | Bagherpour |
| 2018/0259967 | A1 | 9/2018 | Frazzoli et al. |
| 2019/0042679 | A1 | 2/2019 | Stefan et al. |
| 2019/0317219 | A1 | 10/2019 | Smith et al. |
| 2020/0074230 | A1 | 3/2020 | Englard et al. |
| 2020/0189573 | A1 | 6/2020 | King et al. |
| 2020/0192393 | A1 | 6/2020 | Aragon |
| 2020/0249677 | A1 | 8/2020 | Maat et al. |
| 2020/0250363 | A1 | 8/2020 | Partridge et al. |
| 2020/0327313 | A1 | 10/2020 | Kedarisetti et al. |
| 2020/0353943 | A1 | 11/2020 | Siddiqui et al. |
| 2020/0356104 | A1 | 11/2020 | Huai |
| 2020/0363800 | A1 | 11/2020 | Jojo-Verge et al. |
| 2020/0377090 | A1 | 12/2020 | Seccamonte et al. |
| 2020/0409369 | A1 | 12/2020 | Zaytsev et al. |
| 2021/0004647 | A1 | 1/2021 | Amirloo Abolfathi et al. |
| 2021/0049243 | A1* | 2/2021 | Venkatadri ............. G06N 5/04 |
| 2021/0094540 | A1 | 4/2021 | Bagschik et al. |
| 2021/0096264 | A1 | 4/2021 | Bosse et al. |
| 2021/0096571 | A1 | 4/2021 | Modalavalasa et al. |
| 2021/0149404 | A1 | 5/2021 | Zeng et al. |
| 2021/0157882 | A1 | 5/2021 | Liu et al. |
| 2021/0165932 | A1 | 6/2021 | Mohan et al. |
| 2021/0179124 | A1 | 6/2021 | Hollander et al. |
| 2021/0300412 | A1 | 9/2021 | Dingli et al. |
| 2021/0380142 | A1 | 12/2021 | Ramamoorthy et al. |
| 2021/0403035 | A1 | 12/2021 | Danna et al. |
| 2022/0012388 | A1 | 1/2022 | Wyrwas et al. |
| 2022/0019427 | A1 | 1/2022 | Davis et al. |
| 2022/0035375 | A1 | 2/2022 | Rezaee et al. |
| 2022/0063664 | A1 | 3/2022 | Liu |
| 2022/0108049 | A1 | 4/2022 | Letwin et al. |
| 2022/0153298 | A1 | 5/2022 | Wang et al. |
| 2022/0156614 | A1 | 5/2022 | Dalli et al. |
| 2022/0185323 | A1 | 6/2022 | Dolben et al. |
| 2022/0237410 | A1 | 7/2022 | Wrenninge |
| 2022/0266859 | A1* | 8/2022 | Semple .................. G06N 20/00 |
| 2023/0081687 | A1 | 3/2023 | Yan et al. |
| 2023/0205951 | A1 | 6/2023 | Jiang et al. |
| 2023/0289281 | A1* | 9/2023 | Redford ............. G06F 11/3698 |
| 2024/0101107 | A1 | 3/2024 | Jafari Tafti et al. |
| 2024/0166236 | A1 | 5/2024 | Iyra et al. |
| 2024/0370360 | A1* | 11/2024 | Chandler ............ G06F 11/3688 |
| 2024/0400103 | A1 | 12/2024 | Van Heukelom et al. |
| 2024/0425066 | A1 | 12/2024 | Wang et al. |
| 2025/0123952 | A1* | 4/2025 | Whiteside ............. G06F 11/323 |

FOREIGN PATENT DOCUMENTS

| | | |
|---|---|---|
| DE | 102019211009 A1 | 1/2021 |
| WO | 2019199880 A1 | 10/2019 |
| WO | 2021183748 A1 | 9/2021 |

OTHER PUBLICATIONS

International Search Report and Written Opiion dated May 15, 20223 for PCT/US2023/060394, 15 pages.

Behavioral Pedestrial Tracking Using a Camera and LiDAR Sensors on a Moving Vehicle, 2019.

International Search Report mailed in PCT/US2022/073251 on Feb. 2, 2023.

International Search Report mailed in PCT/US2022/073252 on Feb. 2, 2023.

Beck, J.L. et al., "Rare-Event Simulation," 2017, Ghanem R et al. (eds) Handbook of Uncertainty Quantification, Springer, Charm.

Li, W. et al., "AADS: Augmented autonomous driving simulation using data-driven algorithms," Mar. 27, 2019, Science Robotics, 4(28).

Yurtsever, E. et al., A Survey of Autonomous Driving: Common Practices and Emerging Technologies, IEEE Access, vol. 8, Mar. 22, 2020.

Gonzalez, D. et al., A Review of Motion Planning Techniques for Automated Vehicles, IEEE Transactions on Intelligent Transportation Systems, vol. 17, No. 4, Apr. 2016, 1135-1145.

Riedmaier et al., Model Validation and Scenario Selection for Virtual-Based Homologation of Automated Vehicles, Applied Sciences, 11(35), 24 pages, Dec. 23, 2020.

Fremont et al., Formal Scenario-Based Testing of Autonomous Vehicles: From Simulation to the Real World, 2020.

* cited by examiner

SYSTEMS AND METHODS FOR MONITORING PROGRESSION OF SOFTWARE VERSIONS AND DETECTION OF ANOMALIES

CLAIM OF PRIORITY

This application claims priority to U.S. Provisional Appl. No. 63/393,423 filed on Jul. 29, 2022, the disclosure of which is incorporated herein by reference in its entirety.

BACKGROUND

Typically, software developments are incremental in nature, and each new version needs to be tested in order to validate the desired functionality of the software. Software testing is performed in several stages such as unit tests, integration tests, functional tests, and virtual test environments. While for certain types of tests a 100% pass rate can be enforced (e.g., for unit tests), for higher complexity tests a pass rate of less than 100% (e.g., for functional testing like autonomous vehicle (AV) simulation testing) may be considered. For such high complexity tests, often test settings are used that cause the system to fail in order to learn system boundaries of a system.

With increasing complexity of the software and/or the testing performed, it is often not possible to review all pass/fail results manually. As such, simple percentages of different test cases are used as a measure of the quality of a software release. However, this leads to several key testing situations and results going undetected. For example, if some tests change to a fail while others change to pass, the overall percentage still can be in a similar range leading to important pass or fail results not being detected. In other examples, it may be important to identify new failing results in specific areas of tests because they can be more relevant than some rather randomly scattered new failing test results. Specifically, observing only the pass/fail percentages fail to provide the required level of information for software testing.

This document describes methods and systems that address issues such as those discussed above, and/or other issues.

SUMMARY

In one or more scenarios, methods, systems, and computer program products for detecting anomalies during software testing are disclosed. The methods may include generating a plurality of test reports for the software program by executing one or more test cases on a plurality of versions of the software program, generating a control chart based on the plurality of test reports, generating an alert when at least one testing characteristic includes an anomaly over the plurality of versions of the software program as determined based on the control chart. The control chart may include a plot associated with at least one testing characteristic of the software program, and a historical context associated with execution of the one or more test cases on the plurality of versions of the software program.

Implementing systems of the above-described methods can include, but are not limited to, a processor and a non-transitory computer-readable storage medium comprising programming instructions that are configured to cause the processor to implement a method for anomaly detection. Optionally, the programming instructions may be included in a computer program product.

BRIEF DESCRIPTION OF THE DRAWINGS

The accompanying drawings are incorporated herein and form a part of the specification.

DETAILED DESCRIPTION

Provided herein are system, apparatus, device, method and/or computer program product embodiments, and/or combinations and sub-combinations thereof, for progression monitoring of software program over versions (also referred to as releases), for example, a software program for use in vehicle such as AVs.

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" (or "comprises") means "including (or includes), but not limited to." Definitions for additional terms that are relevant to this document are included at the end of this Detailed Description.

The present disclosure relates to techniques for automatic progression monitoring and review of software testing outputs in order to detect anomalies such as outliers, unusual patterns, unusual trends, or the like. The software program or device under test may be a computer program, an integrated circuit with embedded software, computer platform, or any other system that is defined during its development phase as a computer program. This disclosure relates to such computer programs that are tested during and/or after the development phase to ensure good quality. More specifically, the present disclosure relates to a method and apparatus for automatically diagnosing which files, revisions and configurations of such computer programs that causes specific test results for anomaly detection.

An AV is equipped with sensors which enable it to perceive its physical environment, such sensors including for example cameras, radar and lidar. AVs are also equipped with suitably programmed computer programs (i.e., AV stacks or control systems) which are capable of processing data received from the sensors and making decisions based on the context which has been perceived by the sensors. There are different facets to testing the behavior of the sensors and AV stack aboard a particular autonomous vehicle, or a type of autonomous vehicle.

Sensor processing may be evaluated in real-world physical facilities. Similarly, the AV stack may be tested in the physical world, for example by repeatedly driving known test routes, or by driving routes with a human on-board to manage unpredictable or unknown contexts. However, physical world testing is expensive and time-consuming. Increasingly there is more reliance placed on testing using simulated environments. AVs need to have the facility to operate in the same wide variety of circumstances that a human driver can operate in. Such circumstances can incorporate a high level of unpredictability. It is not viable to achieve from physical testing a test of the behavior of an autonomous vehicle in all possible scenarios that it may encounter in its driving life. Increasing attention is being placed on the creation of simulation environments which can provide such testing in a manner that gives confidence that the test outcomes represent potential real behavior of an autonomous vehicle. For example, simulations can be used to validate or train software programs (e.g., an AV stack that utilizes one or more machine learning algorithms, or other software algorithms) executed on AVs to ensure that the software is able to effectively control such AVs. In additional or alternative examples, simulations can be used to learn about the constraints of AVs that use the AV stack. For instance, simulations can be used to understand the operational space of an AV (e.g., an envelope of parameters in which the autonomous AV stack effectively controls the AV) in view of surface conditions, ambient noise, faulty components, etc. Simulations can also be useful for generating feedback for improving operations and designs of AVs. For instance, simulations can be useful for determining an amount of redundancy that is required in an autonomous AV stack, or how to modify a behavior of the autonomous AV stack based on what is learned through simulations. Furthermore, in additional and alternative examples, simulations can be useful to inform the hardware design of AVs, such as optimizing placement of sensors on an AV.

An AV stack includes various software platforms which handle various tasks that help the AV move throughout an environment. These tasks include tasks such as perception, motion planning, and motion control. An AV stack may reside in a software repository (in the physical form of computer-readable memory) that is available to a vehicle's original equipment manufacturer (OEM) and/or to an OEM's suppliers. An AV stack also may be directly deployed on a vehicle.

When creating a simulation scenario to perform testing, validation, and/or training, it is possible to specifically instantiate the environment with various and specific examples. For example, given a specific simulation scenario, the scenario can be parametrized in many different ways, e.g., by the actor attributes like speed, size, heading and potentially more complex parameters, AV parameters like the AV speed, and scene parameters like street properties and locations of different actors in the scene. Each instantiation of such a simulation scenario can be unique and defined. It can become computationally expensive and inefficient to triage all test results because human triage (e.g., of simulation results) has limited capacity for triaging. As such, simple percentages of different test modalities (or test cases) are used as a measure of the quality of a software versions leading to several key testing situations and results going undetected.

This disclosure describes methods for progression tracking and review of testing results (across different test cases) in order to detect anomalies relating to autonomous vehicle sensor and/or control system tests performed using simulation scenarios. The methods and systems of this disclosure allow for, for example, identification of a large impact of changes in a new version or release on the software program quality, determination whether changes in pass/fail behavior are reasonable, determination whether changes in pass/fail behavior are anomalous, identification of occurrence of undesirable changes in a new software program version that lead to anomalous test results, management of various testing parameters and results with a changing set of test cases, or the like.

As such, the methods and systems of this disclosure may provide for an effective and realistic way of training and/or testing the AV stack, AV control system software, or other software in order to identify potential anomalous testing results (e.g., outliers, unusual patterns, etc.) in the AV stack, control system, or other software. For readability, this disclosure may use the simpler terms "training" or "testing" rather than phrase "training and/or testing" to describe methods, systems, and components and subcomponents of methods and systems. However, methods and systems described using these simpler terms should be understood to encompass training and/or testing systems and methods and to include training and/or testing components and subcomponents. The simulation scenarios and test cases may be generated using any now or hereafter know methods such as, for example, the systems and methods described in U.S. patent application Ser. No. 17/647,620 and U.S. patent application Ser. No. 17/647,623, the disclosures of which are incorporated herein by reference in their entirety.

It should be noted that the current disclosure is not limited to monitoring and review of testing results relating to autonomous vehicle software testing, and can be used in association with any now or hereafter known types of software and testing methodologies.

Figure 1:
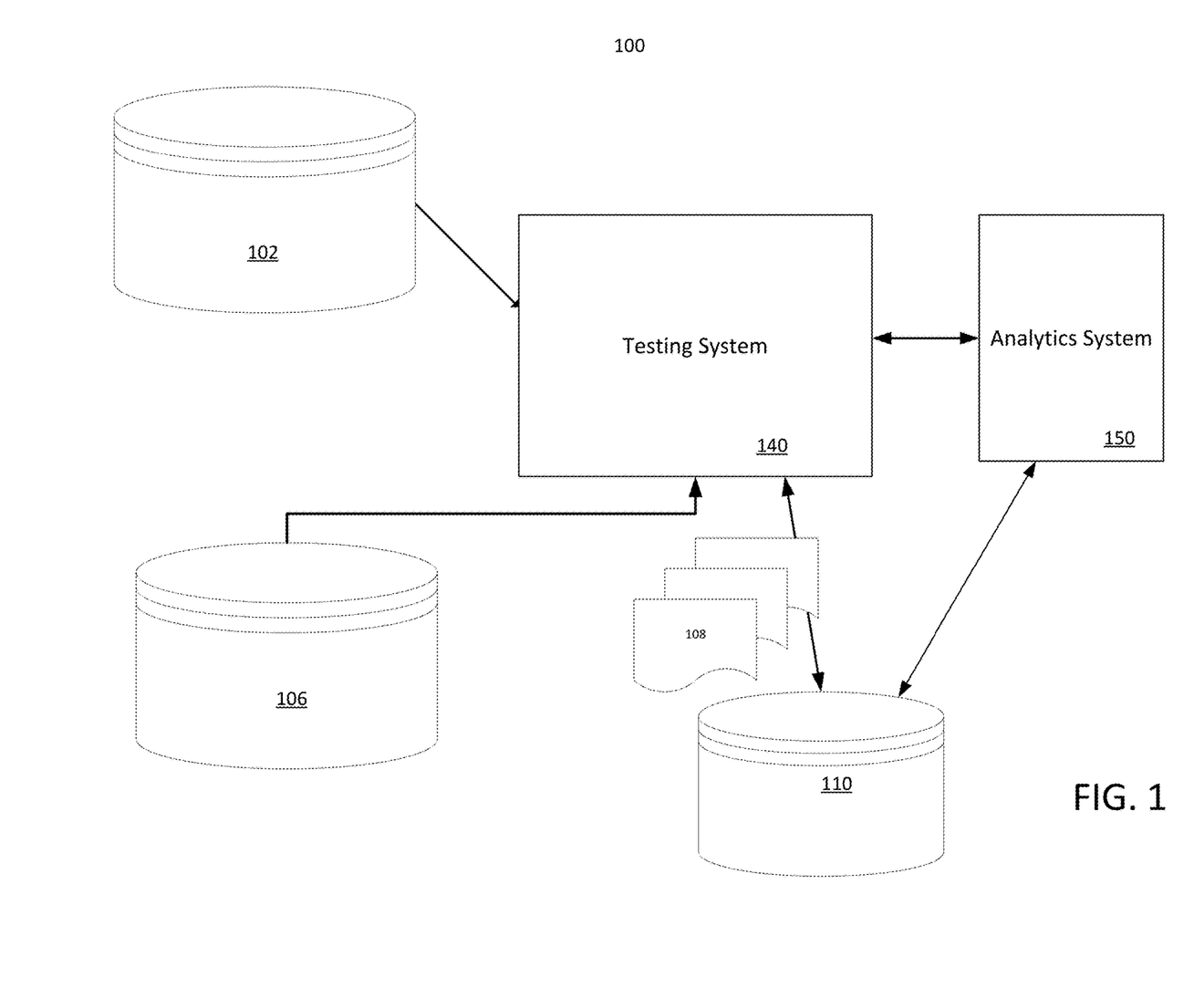
FIG. 1 illustrates an example testing and analysis system in accordance with aspects of the disclosure.

FIG. 1 shows an example software program testing and analysis system 100. Various software programs 102 (e.g., AV stacks and/or components thereof) are subjected to testing by the testing and analysis system 100. As discussed above, software programs 102 may be any of a variety of applications, servers, development tools, word processors, operating systems, and others, and may be tested using test cases (e.g., simulation tests generated using any now or hereafter know methods). "Simulation" is the process of evaluating a system (e.g., an AV system) in a virtual environment with functionality tests, such as without limitation, by executing one or more scenarios.

A test case 106 may be a formal specification (e.g., a simulation scenario configuration), for example conforming to a schema interpretable by a testing system 140. A test case 106 may contain test information for a test of a corresponding software program 102. For example, such information might identify a target software program 102 and/or a version level thereof, input data to be processed by the target software program 102, runtime flags of the testing system 140 or the target software program, simulated hardware or software conditions, functions or features to be tested, metadata identifying related tests, and so forth. Test cases 106 may be embodied as data in a database, flat text files, scripts executable by the testing system 100, etc.

The testing system 140 is an environment that controls and monitors execution of tests. The testing system 140 runs a test case 106 under controlled conditions, initially parsing the test case 106, identifying and marshaling resources as needed, opening log files, assuring that input data is available, initiating network, server, or client connections or other prerequisites for the test, etc. The testing system 140 then executes the target software program 102 until the test is determined by the testing system 140 to have completed, at which time the testing system 140 generates a corresponding test report 108. The testing system 140 determines whether a test case run (execution of a test case) passed or failed. A failure might result from either failure of the target software program 102 or from a failure of the underlying testing system 140. For example, a test case run might hang and terminate when a time limit has been reached by the testing system 140. A test case run might end with a failure code from the target software program 102 when a supporting hardware or software component fails (perhaps due to a latent bug triggered by the test case). The types of things that can cause a test run to fail are well known and extensive.

The results of test case executions may be captured in test reports 108. Test reports 108 may be any form of recorded data such as flat text files, markup text, database entries, etc. In the example of FIG. 1, test reports 108 are stored in a data store 110. An individual test report 108 may store information such as an identifier of a test case 106 that was executed, a date and time of execution, locations of logs, trace files, or other data generated by the test run, diagnostic data, test configuration settings, or other information related to execution of a test case. In particular, a test report 108 may include information indicating whether a test case execution failed or passed, and/or other performance metrics corresponding to the test case execution for a software program. For example, the performance metrics and/or pass fail metrics may be in the form of a numeric value (such as 1-10), as a percentage value (such as 1%-100%), and/or any other suitable form. The Pass/Fail result refers to whether or not the performance of the software program achieved a desired outcome.

As discussed above, failure may be a result of a variety of problems originating in either the target software program, the test bed (e.g., the testing system 140), or both. In one embodiment, test reports 108 are stored in a data store 110, although other forms of storage are equally acceptable, such as a repository or folder of files, a large XML (eXtensible Markup Language) file, or other. In some embodiments, as discussed further below, a test report 108 for a failed test run may also include a field or entry that indicates one or more bugs, errors, faults, or failures that have been determined to have caused the test run to fail. For example, per a user's and/or automated analysis of test reports and/or the software programs, a test report 108 may identify one or more bugs, errors, faults, or failures, and corresponding information. In various embodiments, the test results may be stored as tables in a single database and/or in separate databases or datastores. The data store 110 may include historical information relating to testing (e.g., test cases, test reports, identified bugs, errors, faults, or failures, and/or any other information related to testing) associated with a software program and the corresponding versions.

In various embodiments, the test cases may be organized into groups based on, for example, the functionality of the software programs being tested (e.g., separate groups for perception, prediction, motion planning, etc. related tests), unit tests corresponding to different submodules or modalities of the software programs (e.g., storage locations of software programs in a repository subject to testing, unit tests for hardware in the loop testing versus unit tests for software in the loop testing, or the like), base scenarios being used for simulation tests (e.g., one group per base scenario), failure modes being tested, or the like. Optionally, anomaly detection and progression monitoring may be performed on a test case group basis by monitoring and analysis of test reports corresponding to each group of test cases.

The testing system includes and/or is in communication with an analysis system 150 that analyzes information such as test reports, test case information, software program information (e.g., revisions made to a software program version being tested over a previous version) or the like, for progression monitoring and/or anomaly detection. The analysis system 150 may, optionally, issue alerts including information such as an anomaly detected in the test reports, a cause of the detected anomaly, corrective actions needed, or the like. In various embodiments, the analysis system may utilize statistical process control methods as discussed below.

Optionally, the system 100 may also include a display device for, for example, presenting graphical representations (discussed below), alerts, test reports, test case execution, or the like.

Figure 2:
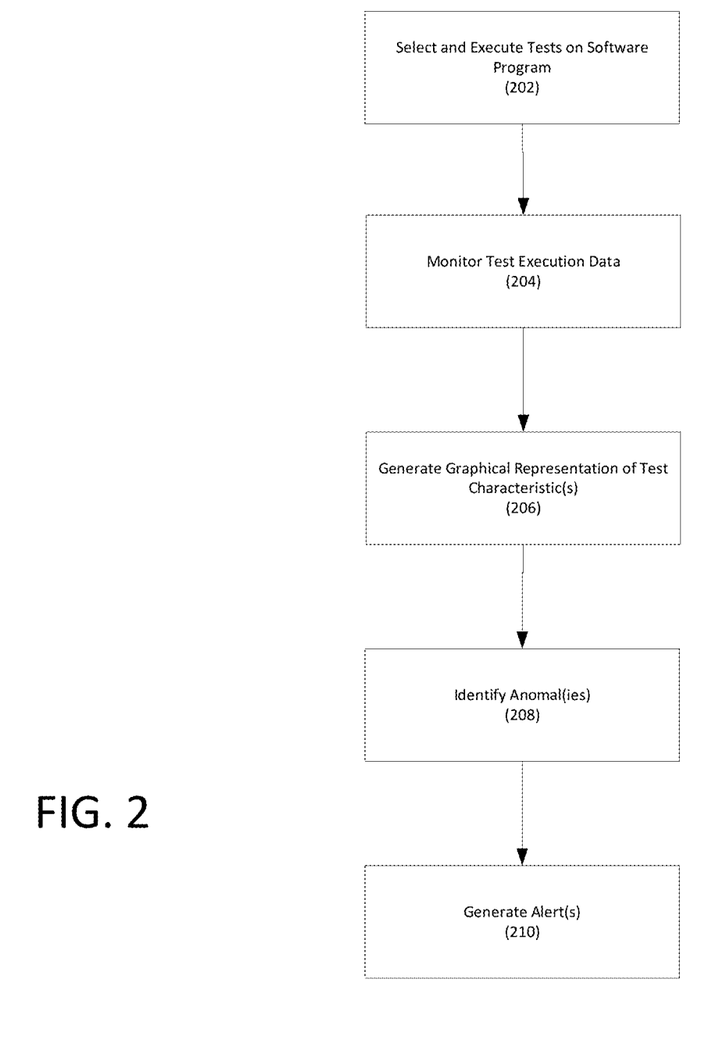
FIG. 2 is a flowchart illustrating an example method for monitoring software program version progression and anomaly detection.

FIG. 2 is a flowchart illustrative of an example process for progression monitoring of software test results and detection of anomalies.

The method starts by selecting and executing one or more tests on a software program (202). In some example embodiments, for testing, the system may simulate operations of an AV by applying the selected test scenarios to one or more of the AV stack or systems (e.g., perception systems, motion planning systems, etc.).

The method may continue to step 204 that includes monitoring data about one or more characteristics of a software program during execution of test cases in step 202. In this disclosure, the term "monitoring" means continuously receiving and recording software program characteristics during test execution, which includes information included in the test reports and/or other test results. As used herein, the term "characteristics" means a feature of the test case being executed, which may change over time, in view of changes to the software programs; software program bugs, errors, faults, or failures, a context (e.g., the test case, current driving environment operation or in-vehicle conditions); adaptation to other systems, such as self-optimization between the different modalities of a software program; or the like. As non-limiting examples, the characteristics may include test failure percentages, test pass rates, pass/fail ratios, system boundaries over simulation scenarios, error modes, numerical performance metrics like minimum distances to actors, system latencies, or the like.

Optionally, the system may cluster the test results or reports of the executed test cases into different groups or clusters based on the groups associated with the corresponding test cases for subsequent cumulative analysis of test reports corresponding to each group of test cases. As discussed above, the test cases may be organized into groups based on, for example, the functionality of the software programs being tested, submodules/modalities of the software programs being tested, base scenarios being used for simulation tests, failure modes being tested, or the like. The clustering may also be done by, for example, using statistical clustering methods (e.g., performing a hierarchical cluster analysis or applying a mixture model such as a Gaussian mixture model). The system may detect similarities among groups of test cases and/or test reports for suggesting that a group of test cases or reports is related and should be analyzed together.

At 206, the system may generate a graphical representation of the characteristic(s) of the test case execution being monitored. In some embodiments, the graphical representation may be a control chart. A control chart is a graphical plot of a characteristic being monitored over time (and/or sample), is a statistical tool that can be used to identify anomalous variations in the characteristic(s) being monitored, and is representative of a historical context corresponding to the testing characteristic.

The control chart may be a univariate control chart including a plot of one characteristic over time and/or sample group, or a multivariate control chart including a plot that summarizes or represents more than one quality characteristic over time and/or sample group.

In various embodiments, a univariate control chart may be generated to include a plot of a testing characteristic of a software program over a plurality of versions, which may be used to identify anomalies in the testing characteristic. An anomaly in a testing characteristic may in turn be indicative of an unacceptable change or error in the software program. For example, the control chart may include a plot of testing characteristics such as failures percentage, pass percentage, or the like over a plurality of versions of a software program for a test case and/or a group of test cases (group being identified as discussed above). In some other embodiments, a univariate control chart may include a plot of a change in testing characteristics over a plurality of versions of a software program, which may be used to identify whether a change in characteristic is anomalous (e.g., when the change is larger than usual).

A univariate control chart comprises a center mean line (X), an upper control limit (UCL), and a lower control limit (LCL). The horizontal axis of the control chart represents the sample number N for a testing characteristic, which corresponds to the chronological order in which the sample was collected. Alternatively, the horizontal axis of the control chart may represent time. These control limits are chosen so that almost all of the data points will fall within these limits as long as the testing characteristic being tested does not exhibit anomalous behavior. As such, if a data point falls outside the control limits, the system may determine that the characteristic is exhibited because of an unacceptable change in the software program being tested. In certain embodiments, the UCL and the LCL may be X times (e.g., 3 times to yield 3-sigma limits, etc.) the range of a standard error (a, Sigma) away from the mean, in both directions. Additionally and/or optionally, the mean, standard error, etc. may be determined based on historical testing data or information associated with the software program and/or the group associated with the tests executed for testing the software program. For example, in various embodiments, a control chart may be generated by determining the arithmetic mean corresponding to the historical data of the testing characteristic being monitored. For example, the arithmetic mean may be calculated for a testing characteristic associated with a test case over a plurality of software program versions, for a testing characteristic for a group of test cases (discussed above), or the like. Next, a standard deviation may be calculated corresponding to the historical data for the testing characteristic being monitored, and used to determine the LCL and the UCL. For example, the UCL may be a sum of the mean (i.e., the arithmetic mean) and a multiple (e.g., three) of the standard deviation times a multiplier of the sample size, while the LCL may be the mean minus a multiple of the standard deviation times a multiplier of the sample size.

Figure 3:
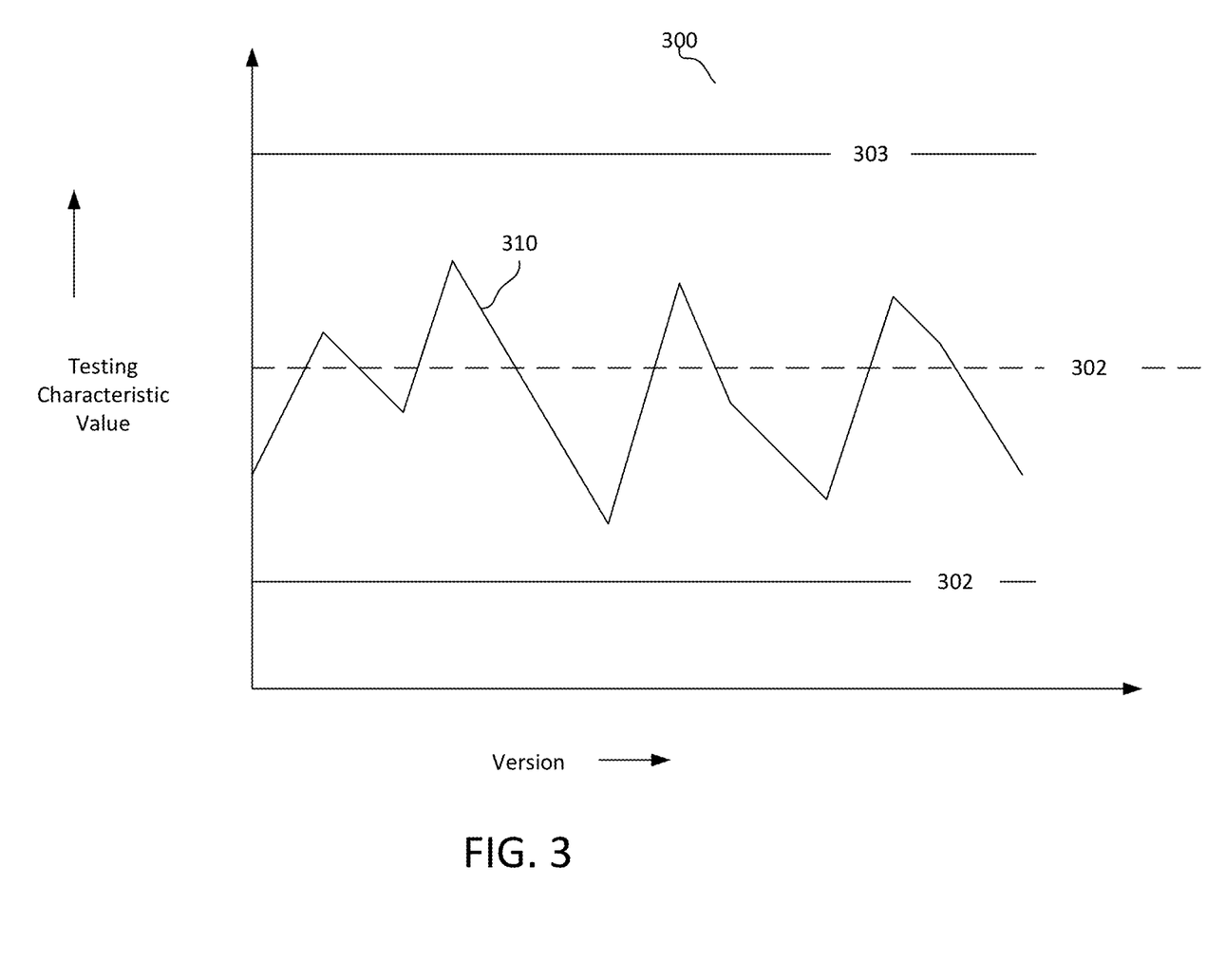
FIG. 3 illustrates an example univariate control chart.

An example univariate control chart 300 shown in FIG. 3 illustrates the center line 301, the LCL 302, and the UCL 303, with the plot 310.

Figure 4A:
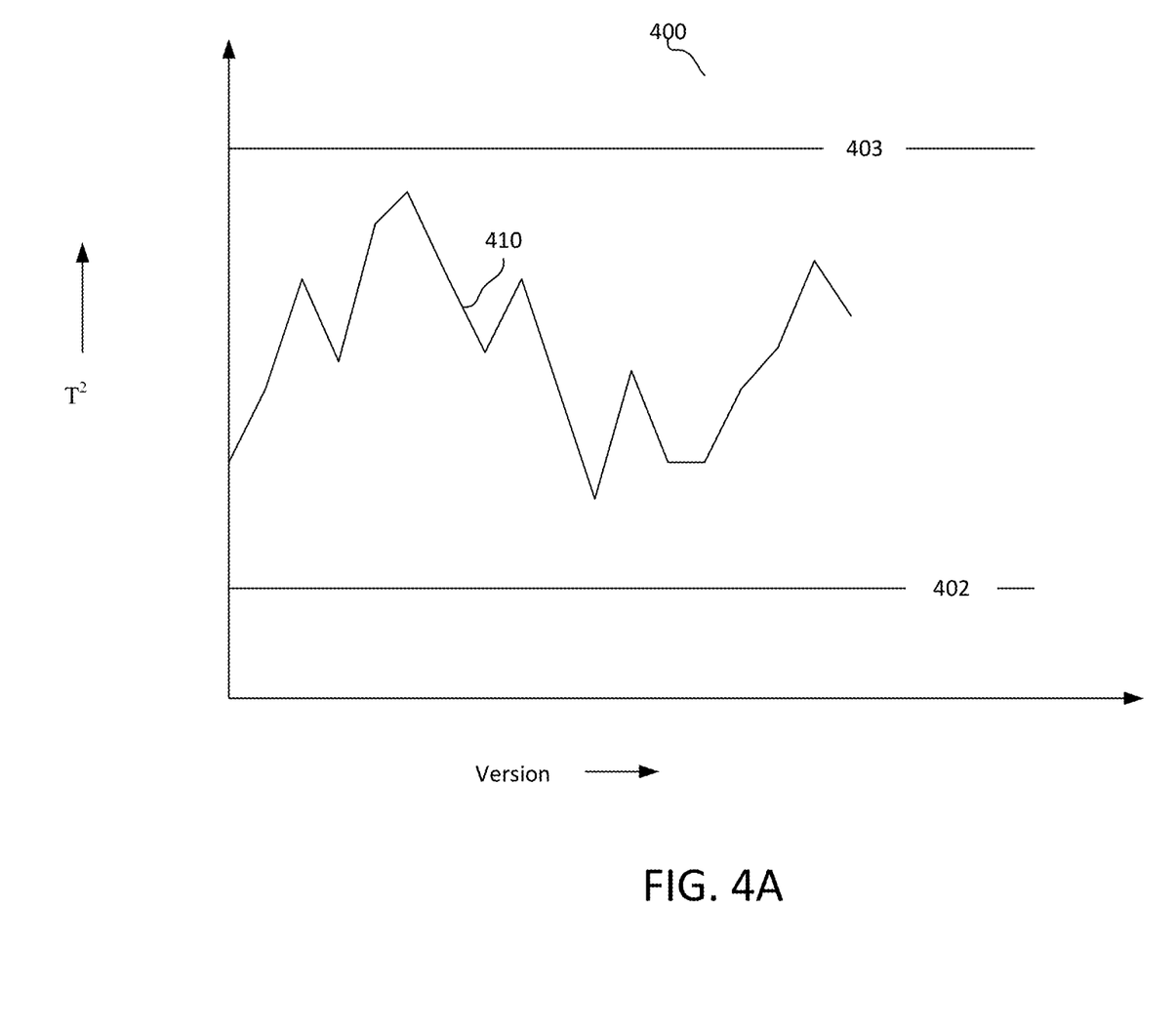
FIG. 4A illustrates an example multivariate control chart.

A multivariate control chart may be generated for simultaneous monitoring of two or more testing characteristics of a software program. The term "multivariate" as used herein, refers to a data element with more than one variable. For example, a data element representing pass/fail ratios over different test case groups (e.g., functionality based test case groups discussed above) for software program versions may be plotted as a multidimensional vector using a multivariate control chart. In some examples, the data element may be a vector, and multivariate may refer to a vector with more than one dimension. Multivariate control charts may be based on squared standardized (generalized) multivariate distances (e.g., Mahalanobis distance) from the general mean. An example multivariate control chart 400 (a $T^2$ chart) shown in FIG. 4A illustrates a LCL 402, a UCL 403, and the plot 410. The $T^2$ distance is a measure that accounts for the covariance structure of a multivariate normal distribution. Other types of now or hereafter known multivariate charts (e.g., ellipsoids—shown in FIG. 4B) are within the scope of this disclosure.

Next, the methods may include analyzing the graphical representation to identify anomalies in the testing characteristic being monitored (208).

Figure 5:
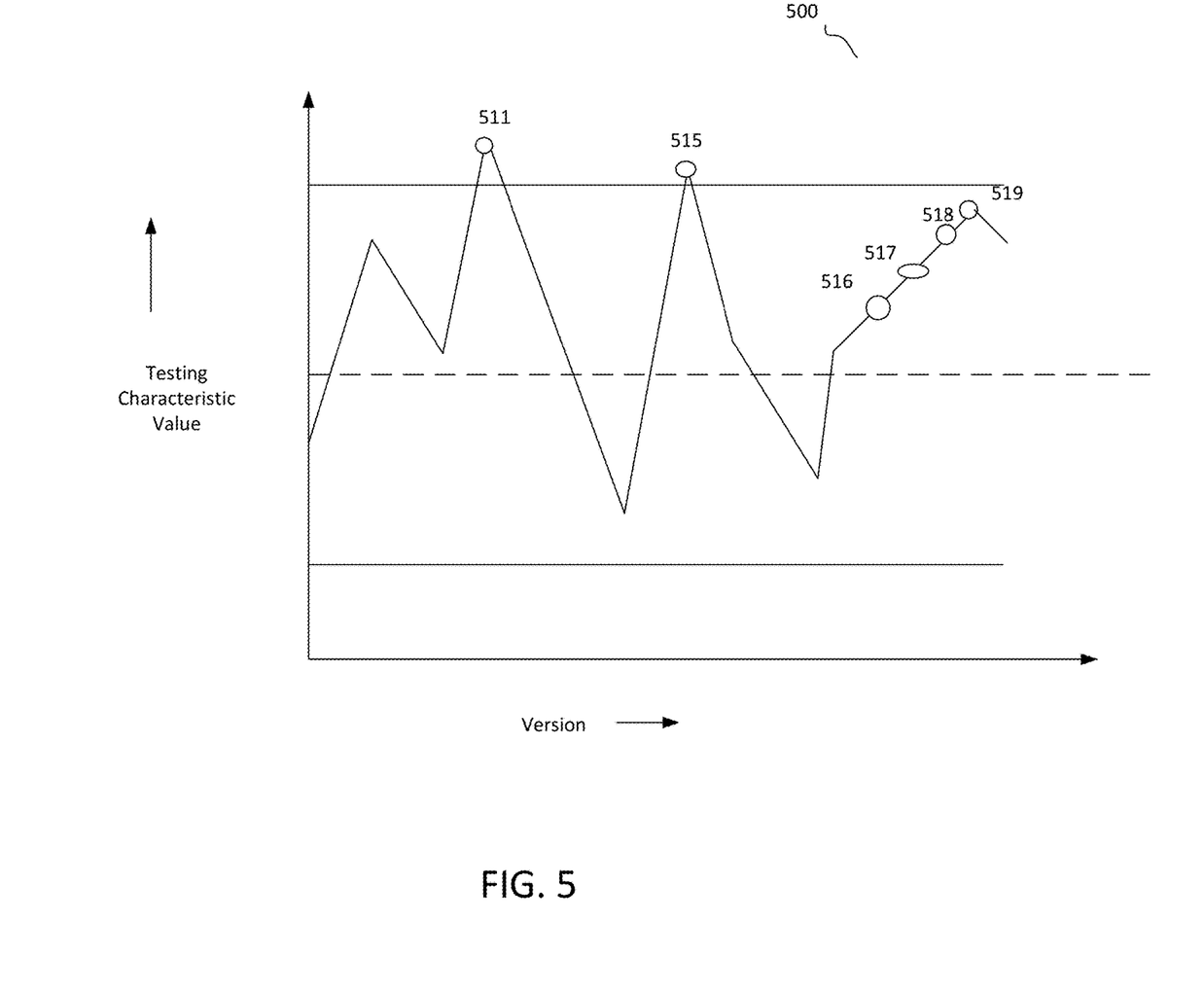
FIG. 5 illustrates example anomalous situations in a univariate control chart.

For example, anomalies may be identified based on patterns in a univariate control chart such as, without limitation, one or more testing characteristic values lie outside of the LCL and/or the UCL, there exists a trend (upward and/or downward) in the testing characteristic values, a threshold number of testing characteristic values being more than a threshold distance from the mean value (i.e., large shifts from the mean), stratification, or the like. For example, for the control chart 500 including a plot 510 of failure percentages over various software versions, the points 511 and 515 lie outside of the UCL and may be considered anomalous compared to historical failure percentages. Similarly, the values 516-519 are trending continuously upwards may be considered indicative of an anomalous behavior of the testing characteristic of the software program overtime or versions. For example, for AV testing, percentage of scenarios with undercut of safety margins to other actors may be monitored and analyzed to determine trends such as slowly increasing, gradually or suddenly increasing in a big shift, and a trend may be used to output an alert as discussed below. In another example, if the minimum distance to objects in a simulation test increasing over different software versions (i.e., a trend is detected), while still being inside some strict safety margin. This may indicate anomalous behavior for predicting, for example, violation of the control limits in one or more future software releases.

As discussed above, when a control chart includes a plot of performance characteristics over a plurality of versions for a test case and/or a group of test cases, the detected anomalies may be indicative of the characteristic being outside of expected limits. Similarly, when a control chart includes a plot of a change in testing characteristics of a software program, the detected anomalies may be indicative of a change in the characteristic being anomalous (e.g., when the change is larger than usual).

Figure 4B:
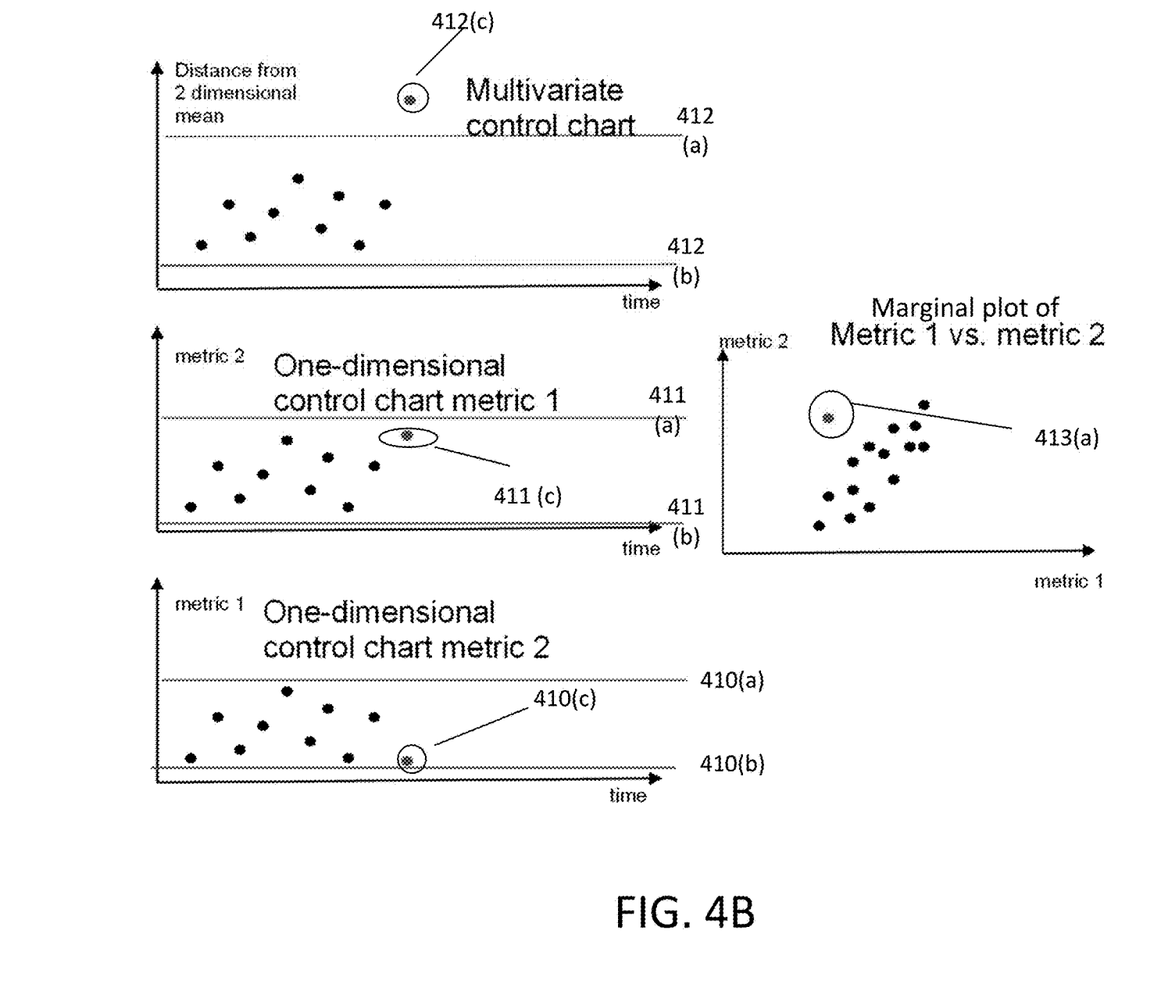
FIG. 4B illustrates example anomalous situations in an example multivariate control chart generated for two metrics being simultaneously monitored, and the corresponding univariate control charts.

When the control chart is a multivariate chart, any now or hereafter known methods for detecting outliers or anomalies may be used such as, without limitation, robust covariance methods, one-class SVM methods, isolation forest methods, local outlier factor methods, or the like. For example, an anomaly may be detected when a multivariate distance from a control mean is greater than a threshold (the threshold determined based on historical context of the control chart). The identified anomalies may correspond to a multidimensional data point that is not similar to a larger set of, for example, historical data points even if it lies inside one dimensional projections of historical data. Specifically, outlier characteristics hidden in high dimensional space which are not directly detectable if the high dimensional data are aggregated to lower dimensions, may be identified using the methods of this disclosure. This allows for identification of critical changes in a software program release, even if they are hidden in high dimensional space. For example, referring to the AV testing scenario discussed above, if the percentage of scenarios for which safety margin violations illustrates some increase, and the same time the percentage of system latency failures illustrates some increase such that both changes individually within their respective one dimensional control limits. However, jointly they may be outside a 2-dimensional ellipsoid and may cause the system to output an alert. For example, in the example shown in FIG. 4B, a high speed (metric 1 and point 410(*c*)) and a high steering wheel angle (metric 2 and point 411(*c*)) individually may be within corresponding acceptable univariate control limits (410(*a*) and 410(*b*), and 411(*a*) and 411(*b*), respectively). However, a multivariate control chart illustrating joint high vehicle speed and high steering wheel angle can be an outlier point 412(*c*) (based control limits 412(*a*) and 412(*b*) generated using a 2-dimensional mean and/or $T^2$ distance) indicating a critical situation. Similar multivariate control charts can be created for any number of parameters being jointly monitored (e.g., 2, 3, 4, and so on). FIG. 4B also illustrates a marginal plot of metric 1 vs. metric 2 that is used for identifying an outlier 413(*a*) based on, for example, a $T^2$ distance.

Optionally, a degree of anomaly in the characteristic may be denoted as Boolean values, numerical values, or the like. For example, distance of an outlier point on a univariate control chart from the mean and/or the LCL/UCL may be used to denote the degree of the detected anomaly.

The methods may continue to generate an alert (210) that includes information about the detected anomalies. Such information may include, for example, an identification of the anomaly, value of the anomaly, degree of the detected anomaly, likely cause of the detected anomaly, suggested corrective or preventative actions, test case information, software program version information, or the like.

In various embodiments, the system may create a data object for one or more detected anomalies. For example, a data object may be a data structure or other data construct. Such a data object refers to a data representation of detected anomalies including information about the corresponding test case, software program version information, identification of the anomaly, value of the anomaly, degree of the detected anomaly, likely cause of the detected anomaly, suggested corrective or preventative actions, or the like. The system may assign a unique identifier to the data object. The unique identifier may be random or pseudo-randomly generated. Alternatively, the unique identifier may be sequentially or otherwise assigned by the system. In various embodiments, the system may store the data object(s) in one or more data stores such that it is accessible by one or more systems. Optionally, a data object may be created for each software program version being tested.

Software program modules, modalities or components that are impacted by changes in a release or version are often known. In various embodiments, the test cases for testing of a software program over its versions may thus be separated in a control group (tests that test the software program components, modalities, or modules that remain unchanged in the version being tested) and an impacted group (tests that test the software program components or modules that have changed in the version being tested). The methods of FIG. 2 discussed above may be performed separately for monitoring test characteristics associated with the control group test cases and test characteristics associated with the impacted group test cases. Since the control group test characteristics remain unchanged over the previous version of the software program, they should be unimpacted and remain close to results from previous releases (i.e., not include anomalies). On the other hand, the impacted group test characteristics may have changed and can include outliers. A comparison of the control group control chart and the impacted group control chart may, therefore, be indicative of the software functionalities that remain unaffected in a new software program version. Moreover, the information can be used to identify the cause for an occurrence of an anomaly such as an outlier. For example, for AV testing, for which there are three software components being tested and monitored (e.g., actor/object tracking, actor prediction, and motion planning). If there are changes in the motion planning stack, but not in actor/object tracking and/pr actor prediction stack, it is expected that the control charts for tracking and prediction will be near constant while performance characteristics for motion planning will change. However, if, for example, changes in prediction related performance metrics are observed, the system may determine that the cause of such changes may be because of potential issues caused either by the (intended) changes in the motion planning stack and/or in (unintended) changes in the prediction stack, but it is unlikely that (intended or unintended) changes in the tracking stack are the cause for observed changes.

The current disclosure takes into consideration historical context of other releases or versions of a software program to determine if the observed test results and changes are acceptable or anomalous. The methods of this disclosure, therefore, allow for identification of unusual or larger impacts of changes made in new versions on the software program quality (e.g., when outliers or trends are detected), even with a changing set of test cases or modalities.

The software test results can also be used for selection of useful scenarios for future testing.

Figure 6:
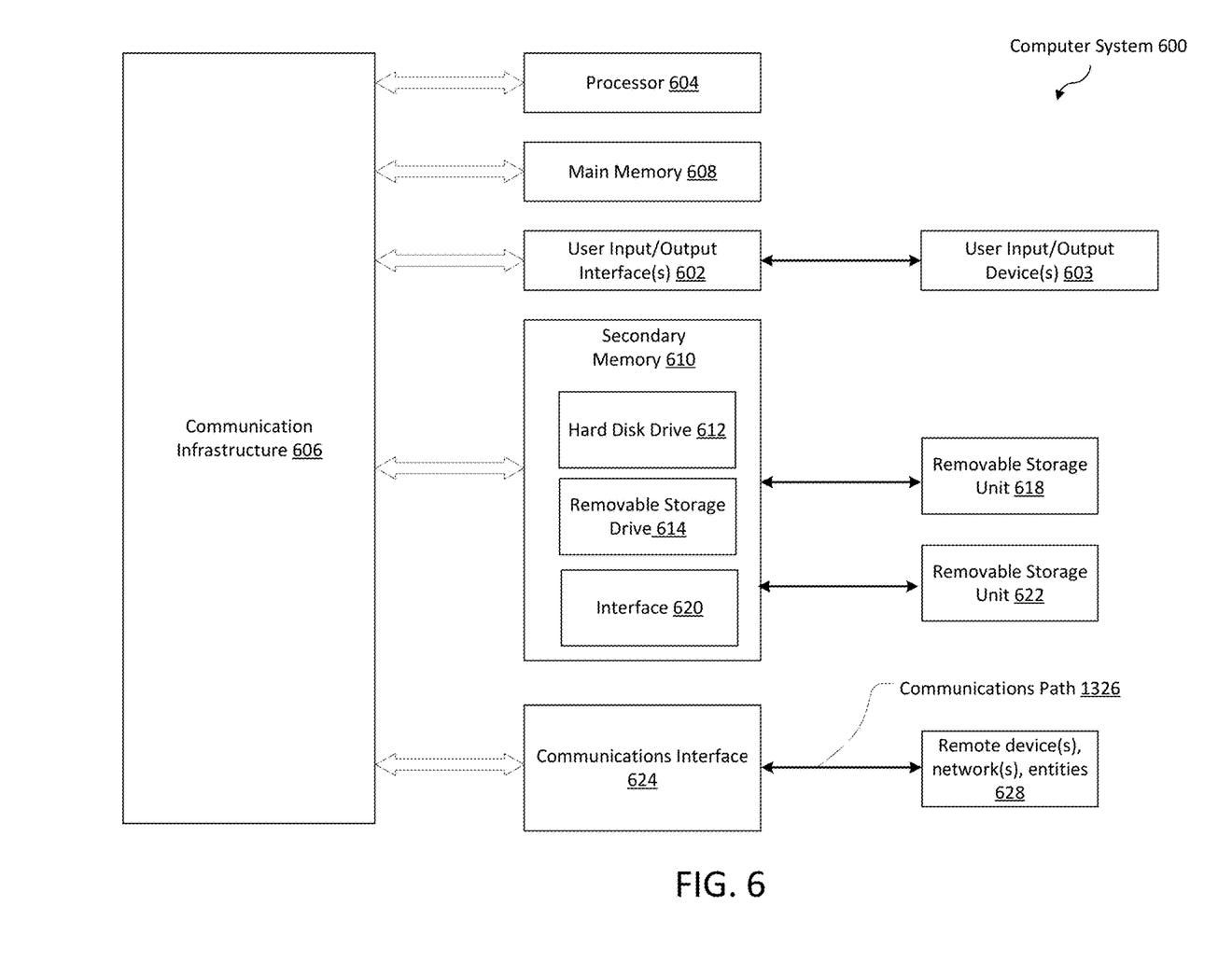
FIG. 6 is an example computer system useful for implementing various embodiments of this disclosure.

Various embodiments can be implemented, for example, using one or more computer systems, such as computer system 600 shown in FIG. 6. Computer system 600 can be any well-known computer capable of performing the functions described herein. Computer system 600 includes one or more processors (also called central processing units, or CPUs), such as a processor 604. Processor 604 is connected to a communication infrastructure or bus 606.

One or more processors 604 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 600 also includes user input/output device(s) 616, such as monitors, keyboards, pointing devices, etc., that communicate with communication infrastructure 606 through user input/output interface(s) 602.

Computer system 600 also includes a main or primary memory 608, such as random-access memory (RAM). Main memory 608 may include one or more levels of cache. Main memory 608 has stored therein control logic (i.e., computer software) and/or data.

Computer system 600 may also include one or more secondary storage devices or memory 610. Secondary memory 610 may include, for example, a hard disk drive 612 and/or a removable storage device or drive 614. Removable storage drive 614 may be a floppy disk drive, a magnetic tape drive, a compact disk drive, an optical storage device, tape backup device, and/or any other storage device/drive.

Removable storage drive 614 may interact with a removable storage unit 618. Removable storage unit 618 includes a computer usable or readable storage device having stored thereon computer software (control logic) and/or data. Removable storage unit 618 may be a floppy disk, magnetic tape, compact disk, DVD, optical storage disk, and/any other computer data storage device. Removable storage drive 614 reads from and/or writes to removable storage unit 618 in a well-known manner.

According to an example embodiment, secondary memory 610 may include other means, instrumentalities, or other approaches for allowing computer programs and/or other instructions and/or data to be accessed by computer system 600. Such means, instrumentalities or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 600 may further include a communication or network interface 624. Communication interface 624 enables computer system 600 to communicate and interact with any combination of remote devices, remote networks, remote entities, etc. (individually and collectively referenced by reference number 628). For example, communication interface 624 may allow computer system 600 to communicate with remote devices 628 over communications path 626, which may be wired and/or wireless, and which may include any combination of LANs, WANs, the Internet, etc. Control logic and/or data may be transmitted to and from computer system 600 via communication path 626.

In an embodiment, a tangible, non-transitory apparatus or article of manufacture comprising a tangible, non-transitory computer useable or readable medium having control logic (software) stored thereon is also referred to herein as a computer program product or program storage device. This includes, but is not limited to, computer system 600, main memory 608, secondary memory 610, and removable storage units 618 and 622, as well as tangible articles of manufacture embodying any combination of the foregoing. Such control logic, when executed by one or more data processing devices (such as computer system 600), causes such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 6. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way. The features from different embodiments disclosed herein may be freely combined. For example, one or more features from a method embodiment may be combined with any of the system or product embodiments. Similarly, features from a system or product embodiment may be combined with any of the method embodiments herein disclosed.

As described above, this document discloses system, method, and computer program product embodiments for anomaly detection in software(s) (e.g., AV software and control systems) are disclosed. The computer program embodiments include programming instructions (e.g., stored in a memory), to cause a processor to perform the anomaly detection methods described in this document. The system embodiments also include a processor which is configured to perform the anomaly detection methods described in this document, e.g., via the programming instructions. More generally, the system embodiments include a system comprising means to perform the steps of the any of the methods described in this document.

In various embodiments, the methods may include generating a plurality of test reports for the software program by executing one or more test cases on a plurality of versions of the software program, generating a control chart based on the plurality of test reports, generating an alert when at least one testing characteristic includes an anomaly over the plurality of versions of the software program as determined based on the control chart. The control chart may include a plot associated with at least one testing characteristic of the software program, and a historical context associated with execution of the one or more test cases on the plurality of versions of the software program.

In any of the above embodiments, generating the control chart may include generating a univariate control chart. Such a univariate control chart can include, for example, the plot associated with a first testing characteristic of the software program, a control line, an upper control limit, and a lower control limit. Optionally, the control line, the upper control limit, and the lower control limit may be generated based on, for example, the historical context associated with execution of the one or more test cases on the plurality of versions of the software program. Additionally and/or alternatively, the methods may include determining that the first testing characteristic includes the anomaly in response to one or more values of the testing characteristic lying outside upper control limit or the lower control limit.

In any of the above embodiments, generating the control chart may include generating a multivariate control chart. Such a multivariate control chart can include the plot associated with a first testing characteristic and a second testing characteristic. Optionally, the methods can include determining that the first testing characteristic and the second testing characteristic include the anomaly in response to a multivariate distance from a control mean being greater than a threshold.

In any of the above embodiments, the methods may also include determining a degree of the anomaly.

In any of the above embodiments, the testing characteristic may include for example, a pass percentage, a failure percentage, a pass/fail ratio, a system boundary over a simulation scenario, error modes, numerical performance metrics like minimum distances to actors, system latencies, or the like.

In any of the above embodiments, the anomaly may include an outlier and/or a trend associated with the at least one testing characteristic.

In any of the above embodiments, the methods may include determining a cause of the anomaly by comparison of a first control chart associated with a control group of test cases and a second control chart associated with an impacted group of test cases. In such embodiments, the control group of test cases may include one or more first test cases that are executed on portions of the software program that remain unchanged over the plurality of versions of the software program, and the impacted group of test cases may include one or more second test cases that are executed on portions of the software program that change over at least some of the plurality of versions of the software program.

Terminology that is relevant to the disclosure provided above includes:

An "automated device" or "robotic device" refers to an electronic device that includes a processor, programming instructions, and one or more components that based on commands from the processor can perform at least some operations or tasks with minimal or no human intervention. For example, an automated device may perform one or more automatic functions or function sets. Examples of such operations, functions or tasks may include without, limitation, navigation, transportation, driving, delivering, loading, unloading, medical-related processes, construction-related processes, and/or the like. Example automated devices may include, without limitation, autonomous vehicles, drones and other autonomous robotic devices.

The term "vehicle" refers to any moving form of conveyance that is capable of carrying either one or more human occupants and/or cargo and is powered by any form of energy. The term "vehicle" includes, but is not limited to, cars, trucks, vans, trains, AVs, aircraft, aerial drones and the like. An "AV" is a vehicle having a processor, programming instructions and drivetrain components that are controllable by the processor without requiring a human operator. An AV may be fully autonomous in that it does not require a human operator for most or all driving conditions and functions. Alternatively, it may be semi-autonomous in that a human operator may be required in certain conditions or for certain operations, or that a human operator may override the vehicle's autonomous system and may take control of the vehicle. AVs also include vehicles in which autonomous systems augment human operation of the vehicle, such as vehicles with driver-assisted steering, speed control, braking, parking and other advanced driver assistance systems.

An "electronic device" or a "computing device" refers to a device that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions.

The terms "memory," "memory device," and the like each refer to a non-transitory device on which computer-readable data, programming instructions or both are stored. The terms "storage," "storage device," and "disk storage" specifically refer to a non-transitory device, such as a hard drive (HDD) or solid-state drive (SDD), that stores data persistently for a relatively longer period. The term "memory" may be used generally in this document to refer either to a storage device that stores information on a persistent basis, or to a device that stores information on a non-persistent basis such as a random access memory (RAM) device. Except where specifically stated otherwise, the terms "memory," "memory device," "storage," "disk storage," "storage device" and the like are intended to include single device embodiments, embodiments in which multiple devices together or collectively store a set of data or instructions, as well as individual sectors within such devices. A "storage location" is a segment, sector, or portion of a storage device. The relative terms "first storage location" and "second storage location" refer to different storage locations, which may be elements of a single device or elements of multiple devices.

The terms "processor" and "processing device" refer to a hardware component of an electronic device that is configured to execute programming instructions, such as a microprocessor or other logical circuit. A processor and memory may be elements of a microcontroller, custom configurable integrated circuit, programmable system-on-a-chip, or other electronic device that can be programmed to perform various functions. Except where specifically stated otherwise, the singular term "processor" or "processing device" is intended to include both single-processing device embodiments and embodiments in which multiple processing devices together or collectively perform a process.

In this document, when relative terms of order such as "first" and "second" are used to modify a noun, such use is simply intended to distinguish one item from another, and is not intended to require a sequential order unless specifically stated. In addition, terms of relative position such as "front" and "rear", or "ahead" and "behind", when used, are intended to be relative to each other and need not be absolute, and only refer to one possible position of the device associated with those terms depending on the device's orientation.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes example embodiments for example fields and applications, it should be understood that the disclosure is not limited to the disclosed examples. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described in this document. Further, embodiments (whether or not explicitly described) have significant utility to fields and applications beyond the examples described in this document.

Embodiments have been described in this document with the aid of functional building blocks illustrating the implementation of specified functions and relationships. The boundaries of these functional building blocks have been arbitrarily defined in this document for the convenience of the description. Alternate boundaries can be defined as long as the specified functions and relationships (or their equivalents) are appropriately performed. Also, alternative embodiments can perform functional blocks, steps, operations, methods, etc. using orderings different than those described in this document.

The features from different embodiments disclosed herein may be freely combined. For example, one or more features from a method embodiment may be combined with any of the system or product embodiments. Similarly, features from a system or product embodiment may be combined with any of the method embodiments herein disclosed.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments but should be defined only in accordance with the following claims and their equivalents.

The features from different embodiments disclosed herein may be freely combined. For example, one or more features from a method embodiment may be combined with any of the system or product embodiments. Similarly, features from a system or product embodiment may be combined with any of the method embodiments herein disclosed.

The breadth and scope of this disclosure should not be limited by any of the above-described example embodiments but should be defined only in accordance with the following claims and their equivalents.

As described above, this document discloses system, method, and computer program product embodiments for generating vehicle trajectories. The system embodiments include a processor or computing device implementing the methods for generating vehicle trajectories. The computer program embodiments include programming instructions, for example, stored in a memory, to cause a processor to perform the methods described in this document. The system embodiments also include a processor which is configured to perform the methods described in this document, for example, via the programming instructions. More generally, the system embodiments include a system comprising means to perform the steps of any of the methods described in this document.

Without excluding further possible embodiments, certain example embodiments are summarized in the following clauses.

Clause 1. A method for detecting an anomaly during testing of a software program, the method comprising, by a processor:
  generating, by executing one or more test cases on a plurality of versions of the software program, a plurality of test reports for the software program;
  generating, based on the plurality of test reports, a control chart, wherein the control chart comprises:
  a plot associated with at least one testing characteristic of the software program, and
  a historical context associated with execution of the one or more test cases on the plurality of versions of the software program;
  generating an alert in response to determining, based on the control chart, that the at least one testing characteristic includes an anomaly over the plurality of versions of the software program.

Clause 2. The method of clause 1, wherein generating the control chart comprises generating a univariate control chart, the univariate control chart comprising:
  the plot associated with a first testing characteristic of the software program,
  a control line,
  an upper control limit, and
  a lower control limit.

Clause 3. The method of clause 2, wherein the control line, the upper control limit, and the lower control limit are generated based on the historical context associated with execution of the one or more test cases on the plurality of versions of the software program.

Clause 4. The method of any of the above clauses, further comprising determining that the first testing characteristic includes the anomaly in response to one or more values of the testing characteristic lying outside upper control limit or the lower control limit.

Clause 5. The method of any of the above clauses, wherein generating the control chart comprises generating a multivariate control chart, the multivariate control chart comprising the plot associated with a first testing characteristic and a second testing characteristic.

Clause 6. The method of clause 5, further comprising determining that the first testing characteristic and the second testing characteristic include the anomaly in response to a multivariate distance from a control mean being greater than a threshold.

Clause 7. The method of any of the above clauses, further comprising determining a degree of the anomaly.

Clause 8. The method of any of the above clauses wherein the at least one testing characteristic comprises at least one of the following: a pass percentage, a failure percentage, a pass/fail ratio, a system boundary over a simulation scenario, error modes, numerical performance metrics, or system latencies.

Clause 9. The method of any of the above clauses, wherein the anomaly comprises an outlier or a trend associated with the at least one testing characteristic.

Clause 10. The method of any of the above clauses, further comprising determining a cause of the anomaly by comparison of a first control chart associated with a control group of test cases and a second control chart associated with an impacted group of test cases, wherein:
  the control group of test cases includes one or more first test cases that are executed on portions of the software program that remain unchanged over the plurality of versions of the software program; and
  the impacted group of test cases includes one or more second test cases that are executed on portions of the software program that change over at least some of the plurality of versions of the software program.

Clause 11. A system comprising means for performing steps of any of the above method clauses.

Clause 12. A computer program, or a storage medium storing the computer program, comprising instructions, which when executed by one or more suitable processors cause any of the processors to perform the steps of any of the above method clauses.

Clause 13. A system for detecting an anomaly during testing of a software program, the system comprising:
  at least one processor; and
  programming instructions stored in a memory and configured to cause the processor to:
  generate, by executing one or more test cases on a plurality of versions of the software program, a plurality of test reports for the software program,
  generate, based on the plurality of test reports, a control chart, wherein the control chart comprises:
  a plot associated with at least one testing characteristic of the software program, and a historical context associated with execution of the one or more test cases on the plurality of versions of the software program, and generate an alert in response to determining, based on the control chart, that the at least one testing characteristic includes an anomaly over the plurality of versions of the software program.

Clause 14. The system of clause 13, wherein the programming instructions that are configured to cause the processor to generate the control chart comprise programming instructions to cause the processor to generate a univariate control chart, the univariate control chart comprising:

the plot associated with a first testing characteristic of the software program, a control line, an upper control limit, and a lower control limit.

Clause 15. The system of clause 14, wherein the control line, the upper control limit, and the lower control limit are generated based on the historical context associated with execution of the one or more test cases on the plurality of versions of the software program.

Clause 16. The system of any of the above system clauses, further comprising programming instructions that are configured to cause the processor to determine that the first testing characteristic includes the anomaly in response to one or more values of the testing characteristic lying outside upper control limit or the lower control limit.

Clause 17. The system of any of the above system clauses, wherein the programming instructions that are configured to cause the processor to generate the control chart comprise programming instructions to cause the processor to generate a multivariate control chart, the multivariate control chart comprising the plot associated with a first testing characteristic and a second testing characteristic.

Clause 18. The system of any of the above system clauses, further comprising programming instructions that are configured to cause the processor to determine a degree of the anomaly.

Clause 19. The system of any of the above system clauses, wherein the at least one testing characteristic comprises at least one of the following: a pass percentage, a failure percentage, a pass/fail ratio, a system boundary over a simulation scenario, error modes, numerical performance metrics, or system latencies.

Clause 20. The system of any of the above system clauses, wherein the anomaly comprises an outlier or a trend associated with the at least one testing characteristic.

Clause 21. The system of any of the above system clauses, further comprising programming instructions that are configured to cause the processor to determine a cause of the anomaly by comparison of a first control chart associated with a control group of test cases and a second control chart associated with an impacted group of test cases, wherein:

the control group of test cases includes one or more first test cases that are executed on portions of the software program that remain unchanged over the plurality of versions of the software program; and the impacted group of test cases includes one or more second test cases that are executed on portions of the software program that change over at least some of the plurality of versions of the software program.

Clause 22. A computer program product comprising a non-transitory computer-readable medium that stores instructions that, when executed by a computing device, will cause the computing device to perform operations comprising:

generating, by executing one or more test cases on a plurality of versions of a software program, a plurality of test reports for the software program;

generating, based on the plurality of test reports, a control chart, wherein the control chart comprises:

a plot associated with at least one testing characteristic of the software program, and a historical context associated with execution of the one or more test cases on the plurality of versions of the software program; and generating an alert in response to determining, based on the control chart, that the at least one testing characteristic includes an anomaly over the plurality of versions of the software program.

What is claimed is:

1. A method for testing of a software program to be executed on an autonomous vehicle, the method comprising, by a processor:

performing autonomous vehicle simulation tests by executing one or more test cases on a plurality of versions of the software program, each test case comprising a simulation scenario configuration;

monitoring at least one testing characteristic of the software program during execution of the one or more test cases, the at least one testing characteristic comprising a feature of the one or more test cases which changes over time in view of changes to the software program;

generating, based on the monitoring, a plurality of test reports containing metrics corresponding to results of test case executions for the software program;

generating (i) a first control chart based on ones of the plurality of test reports that are associated with a control group of test cases and (ii) a second control chart based on ones of the plurality of reports that are associated with an impacted group of test cases, wherein each of the first and second control charts comprises:

a plot of the monitored at least one testing characteristic of the software program over time, and a historical context associated with execution of the one or more test cases on the plurality of versions of the software program;

identifying an anomalous behavior of the at least one testing characteristic based on an unusual pattern in at least the second control chart;

determining a cause of the anomalous behavior by comparing the second control chart to the first control chart;

generating an alert that the at least one testing characteristic has the anomalous behavior over the plurality of versions of the software program; and modifying control system operations and/or sensor design of the autonomous vehicle based on the alert;

wherein the control group of test cases includes one or more first test cases that are executed on portions of the software program that remain unchanged over the plurality of versions of the software program, and the impacted group of test cases includes one or more second test cases that are executed on portions of the software program that change over at least some of the plurality of versions of the software program.

2. The method of claim 1, wherein generating the control chart comprises generating a univariate control chart, the univariate control chart comprising:

the plot associated with a testing characteristic of the software program,
a control line,
an upper control limit, and
a lower control limit.

3. The method of claim 2, wherein the control line, the upper control limit, and the lower control limit are generated based on the historical context associated with execution of the one or more test cases on the plurality of versions of the software program.

4. The method of claim 2, further comprising determining that the testing characteristic includes an anomaly in response to one or more values of the testing characteristic lying outside upper control limit or the lower control limit.

5. The method of claim 1, wherein generating the control chart comprises generating a multivariate control chart, the multivariate control chart comprising the plot associated with a first testing characteristic and a second testing characteristic.

6. The method of claim 5, further comprising determining that the first testing characteristic and the second testing characteristic include an anomaly in response to a multivariate distance from a control mean being greater than a threshold.

7. The method of claim 1, further comprising determining a degree of the anomalous behavior.

8. The method of claim 1, wherein the at least one testing characteristic comprises at least one of the following: a pass percentage, a failure percentage, a pass/fail ratio, a system boundary over a simulation scenario, error modes, numerical performance metrics, or system latencies.

9. The method of claim 1, further comprising:
identifying a group of test cases based on a functionality of the software program being tested, submodules/modalities of the software programs being tested, base scenarios being used for simulation tests, or failure modes being tested;
wherein the plot of the control chart includes a plot of the monitored at least one testing characteristic over the plurality of versions of the software program for the identified group of test cases.

10. A system for testing of a software program to be executed on an autonomous vehicle, the system comprising:
at least one processor; and
programming instructions stored in a memory and configured to cause the processor to:
perform autonomous vehicle simulation tests by executing one or more test cases on a plurality of versions of the software program, each test case comprising a simulation scenario configuration;
monitor at least one testing characteristic of the software program during execution of the one or more test cases, the at least one testing characteristic comprising a feature of the one or more test cases which changes over time in view of changes to the software program;
generate a plurality of test reports containing metrics corresponding to text case executions for the software program,
generate (i) a first control chart based on ones of the plurality of test reports that are associated with a control group of test cases and (ii) a second control chart based on ones of the plurality of reports that are associated with an impacted group of test cases, wherein each of the first and second control charts comprises:
a plot of the monitored at least one testing characteristic of the software program over time, and
a historical context associated with execution of the one or more test cases on the plurality of versions of the software program, and
identify an anomalous behavior of the at least one testing characteristic based on an unusual pattern in at least the second control chart;
determine a cause of the anomalous behavior by comparing the second control chart to the first control chart;
generate an alert, based on the control chart, that the at least one testing characteristic has the anomalous behavior over the plurality of versions of the software program; and
modify control system operations and/or sensor design of the autonomous vehicle based on the alert;
wherein the control group of test cases includes one or more first test cases that are executed on portions of the software program that remain unchanged over the plurality of versions of the software program, and the impacted group of test cases includes one or more second test cases that are executed on portions of the software program that change over at least some of the plurality of versions of the software program.

11. The system of claim 10, wherein the programming instructions that are configured to cause the processor to generate the control chart comprise programming instructions to cause the processor to generate a univariate control chart, the univariate control chart comprising:
the plot associated with a testing characteristic of the software program,
a control line,
an upper control limit, and
a lower control limit.

12. The system of claim 11, wherein the control line, the upper control limit, and the lower control limit are generated based on the historical context associated with execution of the one or more test cases on the plurality of versions of the software program.

13. The system of claim 11, further comprising programming instructions that are configured to cause the processor to determine that the testing characteristic includes an anomaly in response to one or more values of the testing characteristic lying outside upper control limit or the lower control limit.

14. The system of claim 10, wherein the programming instructions that are configured to cause the processor to generate the control chart comprise programming instructions to cause the processor to generate a multivariate control chart, the multivariate control chart comprising the plot associated with a first testing characteristic and a second testing characteristic.

15. The system of claim 10, further comprising programming instructions that are configured to cause the processor to determine a degree of the anomalous behavior.

16. The system of claim 10, wherein the at least one testing characteristic comprises at least one of the following: a pass percentage, a failure percentage, a pass/fail ratio, a system boundary over a simulation scenario, error modes, numerical performance metrics, or system latencies.

17. The system of claim 10, wherein:
the processor is further caused to identify a group of test cases based on a functionality of the software program being tested, submodules/modalities of the software programs being tested, base scenarios being used for simulation tests, or failure modes being tested; and the plot of the control chart includes a plot of the monitored at least one testing characteristic over the plurality of versions of the software program for the identified group of test cases.

18. A computer program product comprising a non-transitory computer-readable medium that stores instructions that, when executed by a computing device, will cause the computing device to perform operations comprising:

performing autonomous vehicle simulation tests by executing one or more test cases on a plurality of versions of the software program, each test case comprising a simulation scenario configuration;

monitoring at least one testing characteristic of the software program during execution of the one or more test cases, the at least one testing characteristic comprising a feature of the one or more test cases which changes over time in view of changes to the software program;

generating, based on the monitoring, a plurality of test reports for the software program;

generating (i) a first control chart based on ones of the plurality of test reports that are associated with a control group of test cases and (ii) a second control chart based on the plurality of reports that are associated with an impacted group of test cases, wherein each of the first and second control charts comprises:

a plot of the monitored at least one testing characteristic of the software program over time, and a historical context associated with execution of the one or more test cases on the plurality of versions of the software program; and identifying an anomalous behavior of the at least one testing characteristic based on an unusual pattern in at least the second control chart;

determine a cause of the anomalous behavior by comparing the second control chart to the first control chart;

generating an alert that the at least one testing characteristic has the anomalous behavior over the plurality of versions of the software program; and modifying control system operations and/or sensor design of the autonomous vehicle based on the alert;

wherein the control group of test cases includes one or more first test cases that are executed on portions of the software program that remain unchanged over the plurality of versions of the software program, and the impacted group of test cases includes one or more second test cases that are executed on portions of the software program that change over at least some of the plurality of versions of the software program.

* * * * *